United States Patent [19]

Gorton et al.

[11] Patent Number: 4,832,299

[45] Date of Patent: May 23, 1989

[54] CLAMP FIXTURE

[75] Inventors: Lanny A. Gorton, Sunland; Gerald W. Schmidt, Ventura, both of Calif.

[73] Assignee: Pacesetter Infusion, Ltd., Sylmar, Calif.

[21] Appl. No.: 128,744

[22] Filed: Dec. 4, 1987

[51] Int. Cl.$^4$ .............................................. E04G 3/08
[52] U.S. Cl. ................................ 248/231.7; 81/480; 248/122; 248/284; 248/291; 403/84; 403/92
[58] Field of Search ............. 248/231.7, 284, 291, 248/184, 185, 122; 403/84, 92; 81/480

[56] References Cited

U.S. PATENT DOCUMENTS

| | | | |
|---|---|---|---|
| 1,211,527 | 1/1917 | Berndt | 248/231.7 X |
| 2,508,974 | 5/1950 | Soditch et al. | 248/291 |
| 2,709,563 | 5/1955 | Starkey | 248/231.7 X |
| 2,919,602 | 1/1960 | Spraragen | 81/480 X |
| 3,116,022 | 12/1963 | Davis | 248/291 X |
| 4,196,821 | 4/1980 | Teti, Jr. et al. | 248/291 X |

FOREIGN PATENT DOCUMENTS

| | | | |
|---|---|---|---|
| 947347 | 6/1949 | France | 248/237.1 |
| 46684 | 3/1920 | Sweden | 248/237.1 |

Primary Examiner—Alvin C. Chin-Shue
Assistant Examiner—David L. Talbott
Attorney, Agent, or Firm—Leslie S. Miller; Stuart O. Lowry

[57] ABSTRACT

An improved clamp fixture is provided for supporting a medical instrument or the like in a selected orientation relative to a variety of different support structures, such as an upright pole, a tabletop edge, a bed rail, etc. The clamp fixture comprises an open-sided base bracket for receiving the selected support structure to extend through the base bracket along a first axis. A clamp screw is carried by the base bracket and is adjustable to securely retain the support structure against an inner support surface of the base bracket. A frame member is mounted on the base bracket for rotation generally about a second axis perpendicular to the first axis, with a spring-loaded lock pin releasably securing the frame member in one of several preset rotational positions. At least one frame arm extends outwardly from the frame member for connection to the medical instrument or the like in a manner permitting rotation of the medical instrument about a third axis perpendicular to the first and second axes. A detent lock mechanism cooperates between the instrument and the frame arm to releasably lock the instrument in a selected position of rotational adjustment. In addition, the preferred clamp fixture includes an adjustable clutch mechanism for controlling the clamping force which can be applied by the clamp screw to a support structure, wherein this clutch mechanism can be adjusted by a specialized tool after engaging the support structure to prevent unauthorized removal or theft.

27 Claims, 2 Drawing Sheets

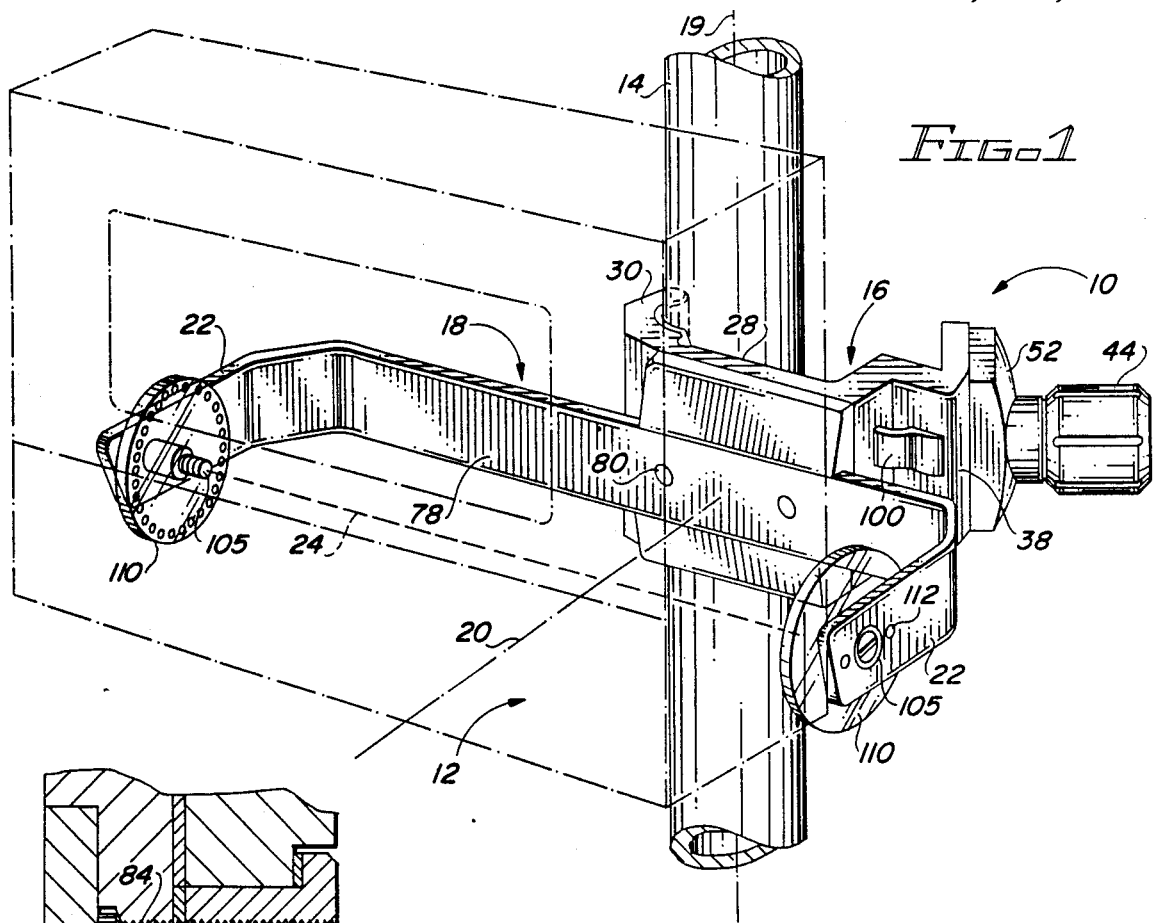
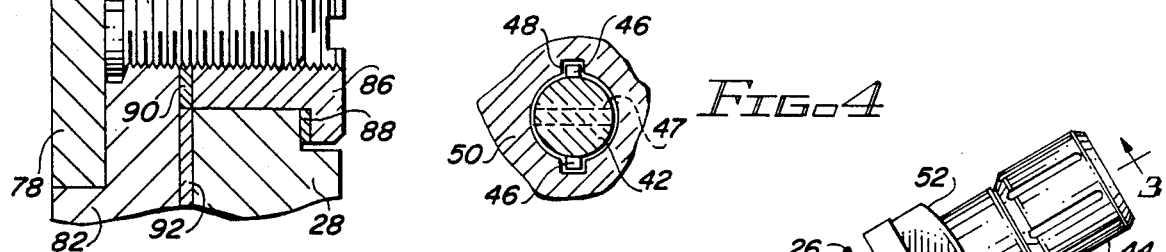
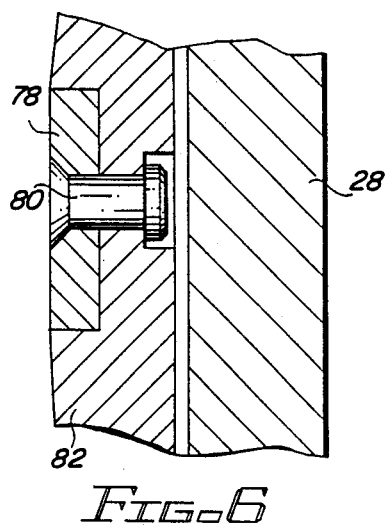
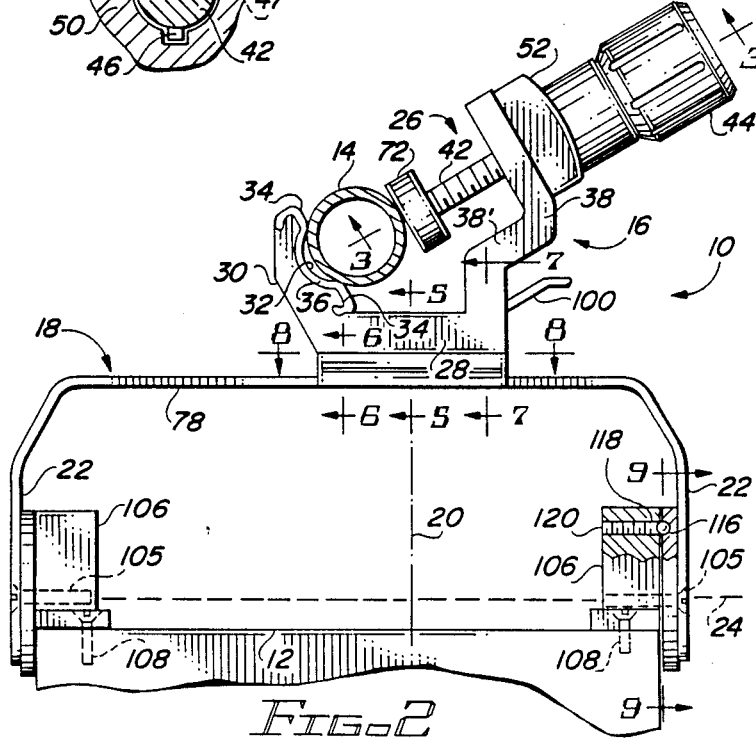

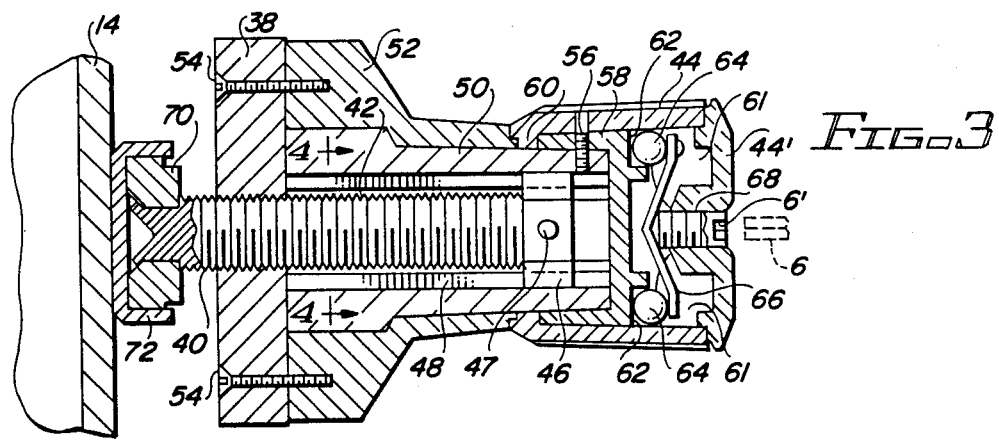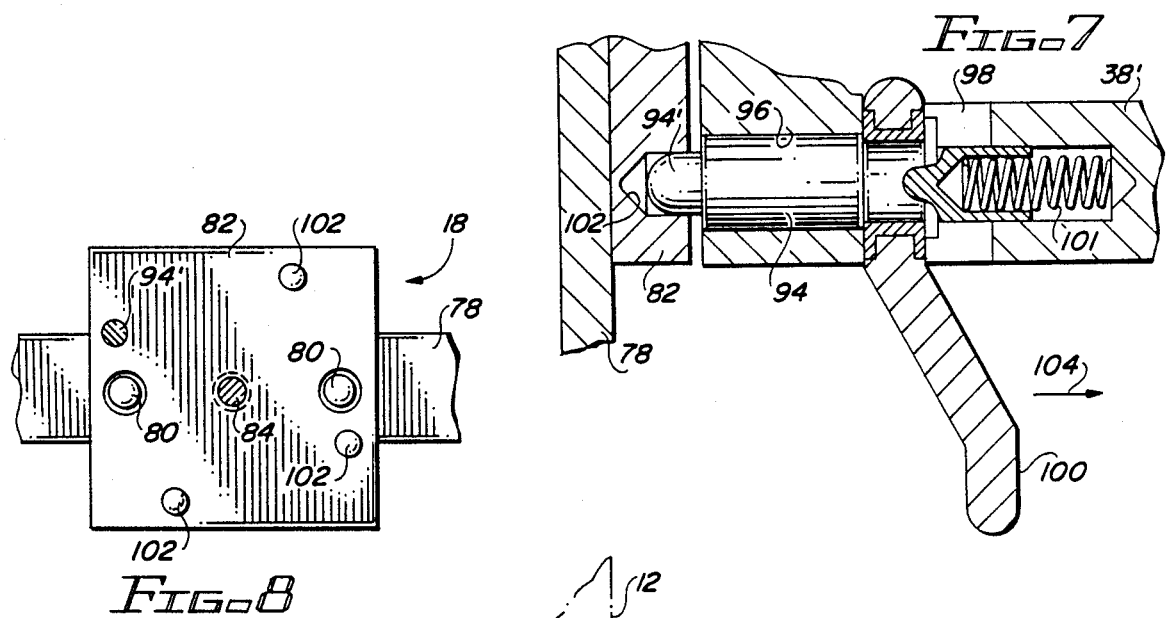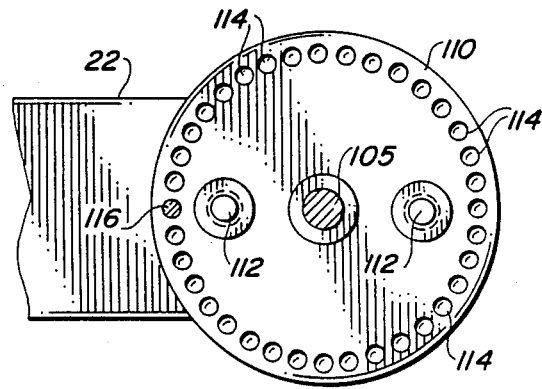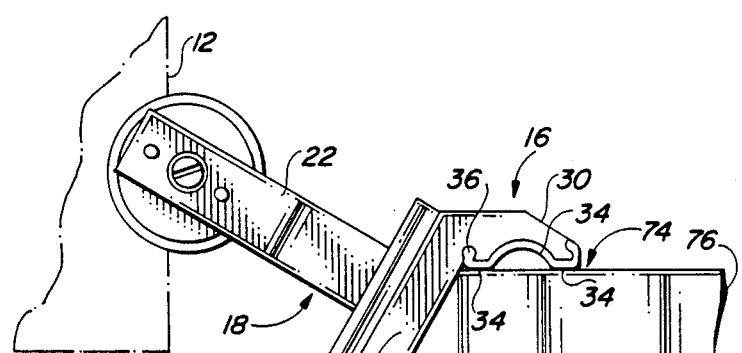

CLAMP FIXTURE

BACKGROUND OF THE INVENTION

This invention relates generally to clamp-type mounting devices for use in securely supporting fragile medical instruments and the like with respect to a conveniently available support surface or structure. More particularly, this invention relates to an improved clamp fixture adapted for stable connection to a variety of different support structures, in combination with a versatile adjustment capability to permit a medical instrument or the like to be supported in a selected orientation chosen for optimum visibility, access, etc.

In the medical arts, a wide variety of relatively sophisticated medical instruments including electronic devices and the like are available and are used frequently in the course of patient treatment. For example, in a hospital or medical clinic environment, a variety of electronic instruments may be required to monitor selected parameters indicative of patient condition, or to deliver selected fluids to the patient in accordance with a prescribed time schedule, or to perform a variety of other important functions in the course of patient diagnosis or treatment. When use of such devices is desired or required, the appropriate instrument is normally transported from a storage site to the patient location, such as patient bedside in a hospital, and is there appropriately coupled to or otherwise operated in conjunction with the patient to perform the desired functions. Importantly, in recent years, advances in the electronic arts particularly with respect to solid state technology have permitted many such medical instruments to be constructed with a relatively small, preferably hand-held size for optimum portability and minimum obstruction of a patient bedside location or the like.

The relatively small size of many modern electronic medical instruments and the like necessitates the use of some type of clamping or locking device to prevent the instrument from being knocked about or otherwise inadvertently moved during instrument operation. With such clamping or locking device, the instrument can be retained in the desired close proximity with the patient in a manner minimizing risk of disrupting electrical or fluid flow lines coupled between the instrument and the patient. In addition, the clamping or locking device functions to retain the instrument in a predetermined orientation which may be required for proper instrument operation, or for easy viewing of parameters displayed by the instrument, or for facilitated adjustment of instrument controls, etc.

In the past, clamping or locking devices used to support relatively small medical instruments and the like have generally been designed to lock onto a specific type of support structure. For example, many spring-loaded and screw-down type clamps have been proposed for securely locking onto a vertically oriented pole of the type used commonly to support intravenous (IV) fluid infusion equipment. Other types of clamps have been designed to lock onto other specific surfaces, such as the edge of a horizontally oriented tabletop. However, these prior clamp devices generally have not provided satisfactory instrument anchoring or proper instrument orientation when the clamp device is locked onto an alternative support structure which differs from the one for which it was specifically designed. Accordingly, hospitals and the like have been required to obtain different types of clamping devices designed to lock onto different support structures, or, alternately, to provide the same type of support structure such as an upright IV pole each time the particular instrument is used.

There exists, therefore, a significant need for an improved clamping device for use in securely supporting and orienting a medical instrument or the like, wherein the clamping device is adapted to lock securely onto a variety of different support structures commonly present in a medical environment, and to permit the orientation of a supported medical instrument to be adjusted as desired to a selected position. The present invention fulfills these needs, and provides further related advantages.

SUMMARY OF THE INVENTION

In accordance with the invention, an improved clamp fixture is provided for use in supporting a medical instrument or the like with respect to a selected available support structure, and in a selected orientation for ease of instrument use and access. The clamp fixture is designed to lock in a secure and stable manner onto a variety of different horizontally or vertically oriented or other support structures, and then to undergo appropriate adjustment to position a supported medical instrument or the like to a desired orientation.

In a preferred form of the invention, the clamp fixture comprises a base bracket having a contoured, approximately U-shaped geometry to receive the selected support structure. The base bracket defines a plurality of inner bracket support surfaces of different geometry for stable engagement of different support structures. At least one on the inner bracket support surfaces defines an elongated recess of curved part-cylindrical geometry for fitting closely against an upright pole of generally circular cross section, whereas at least one other inner bracket support surface defines a relatively flat surface for fitting snugly against a horizontal tabletop surface or the like. A clamp screw carried by the base bracket is advanced by rotation of an adjustment knob for clamping the selected support structure firmly against the appropriate inner bracket support surface. A clutch mechanism is coupled between the adjustment knob and the clamp screw to prevent application of excessive clamping forces to the support structure. The clutch mechanism is adapted for adjustment by means of a specialized tool to permit selection of the clamping force to be applied to the support structure, and, if desired, reduced torque transmission between the adjustment knob and the clamp screw after support structure engagement to prevent unauthorized removal or theft of the clamp fixture.

The base bracket rotatably supports a frame member to permit adjustment in the orientation of the frame member in accordance with the particular support structure to which the base bracket is attached. In the preferred form, the frame member comprises a generally U-shaped component having a central frame bar supported on the base bracket for rotation about an axis generally perpendicular to a primary axis of the support structure engaged by and extending through the base bracket. A spring-loaded lock pin carried on the base bracket is releasably engaged with the frame member to releasably lock the frame member in one of several rotational positions, such as at ninety degree intervals relative to the base bracket.

The frame member in turn supports at least one frame arm adapted for connection to the selected medical instrument for supporting said instrument in one of a plurality of rotational positions. In the preferred form, the medical instrument is releasably locked in the selected rotational position relative to a rotational axis oriented generally perpendicular to the frame member rotational axis and the primary axis of the support structure engaged by the base bracket. Accordingly, irrespective of the orientation of the support structure engaged by the base bracket, the combination of rotational adjustments of the medical instrument relative to the frame arm and the frame member relative to the base bracket permits the medical instrument to be supported in substantially any desired orientation.

With the generally U-shaped frame member, a pair of generally parallel frame arms are located at opposite ends of the central frame bar for coaxial attachment to opposite sides of the medical instrument. Appropriate fasteners such as screws are fastened through the frame arms into a respective pair of mounting shoes which are secured in turn to the medical instrument. A detent lock mechanism includes index disks mounted at the inboard sides of the frame arms and including inwardly presented recessed detents in annular arrays. These recessed detents on the index disks are positioned for receiving detent balls on the mounting shoes, whereby the mounting shoes can be releasably rotated along with the medical instrument to a selected one of a plurality of rotational positions by shifting the detent balls to engage different detents formed in the index disks.

Other features and advantages of the invention will become more apparent from the following detailed description, taken in conjunction with accompanying drawings which illustrate, by way of example, the principles of the invention.

BRIEF DESCRIPTION OF THE DRAWINGS

The accompanying drawings illustrate the invention. In such drawings.

FIG. 1 is a perspective view illustrating a clamp fixture embodying the novel features of the invention, and shown mounted onto an upright support pole;

FIG. 2 is a top plan view of the clamp fixture of FIG. 1;

FIG. 3 is an enlarged fragmented vertical sectional view taken generally on the line 3—3 of FIG. 2;

FIG. 4 is a further enlarged fragmented vertical section taken generally on the line 4—4 of FIG. 3;

FIG. 5 is an enlarged fragmented vertical sectional view taken generally on the line 5—5 of FIG. 2;

FIG. 6 is an enlarged fragmented horizontal sectional view taken generally on the line 6—6 of FIG. 2:

FIG. 7 is another enlarged fragmented vertical sectional view taken generally on the line 7—7 of FIG. 2;

FIG. 8 is still another enlarged fragmented vertical sectional view taken generally on the line 8—8 of FIG. 2;

FIG. 9 is an enlarged fragmented vertical sectional view generally on the line 9—9 of FIG. 2; and FIG. 10 is a side elevational view showing the clamp fixture in an alternative mounting position.

DETAILED DESCRIPTION OF THE PREFERRED EMBODIMENT

As shown in the exemplary drawings, an improved clamp fixture referred to generally by the reference numeral 10 is provided for use in supporting a selected medical instrument 12 (FIGS. 1 and 2) or the like in a secure and stable manner. The clamp fixture 10 is designed as an essentially universal clamping device for locking onto a variety of different types of support structures, such as an upright pole 14 as depicted in FIG. while permitting positional adjustment of the supported medical instrument 12 to a selected orientation.

The improved clamp fixture 10 of the present invention is designed primarily for use in supporting the medical instrument 12 in a stable selected orientation in close proximity with a patient (not shown) associated with the instrument. Although the clamp fixture 10 shown in the illustrative drawings is intended primarily to support an insulin infusion pump of the type used to deliver scheduled insulin doses to a diabetic patient, it will be understood that the clamp fixture can be used to support many other types of medical and nonmedical instruments and accessories which will typically include electronic components. The clamp fixture is designed to provide a stable base locked onto an available support structure which may differ in type and physical orientation when the instrument is moved from one location to another for use. The clamp fixture accommodates attachment to such different support structures by including multiple adjustment features for reorientation of the medical instrument to the desired optimum position chosen, for example, for proper intrument operation, easy visibility of parameters displayed by the instrument, and/or access to instrument control components.

In general terms, as depicted in FIGS. 1 and 2 in accordance with a preferred construction of the invention, the clamp fixture 10 comprises a base bracket 16 adapted to lock onto the selected support structure such as the vertically oriented pole 14 of a standard type used in many medical applications to support intravenous (IV fluid infusion equipment. A frame member 18 is rotatably connected to the base bracket 16 for rotation about an axis 20 oriented generally perpendicular to a central axis 19 of the upright pole 14, and this frame member 18 in turn includes a pair of frame arms 22 equipped with means for rotatably supporting the medical instrument 12 relative to an axis 24 disposed perpendicular to the base bracket axis 20 and the pole axis 19. Releasable lock means are provided, as will be described, for securing the frame member 18 relative to the base bracket 16, and for securing the instrument 12 relative to the frame arms 22. Accordingly, irrespective of the orientation of the support structure to which the base bracket 16 is attached, the frame member 18 and the frame arms 22 accommodate orientation of the medical instrument 12 in substantially any desired position.

More specifically, as shown best in FIGS. and 2, the base bracket 16 has a generally U-shaped configuration defining an axially open internal channel 26 extending along an axis corresponding generally with the vertical axis 19 of the upright pole 14. This open channel 26 is open-sided to permit reception of the upright pole 14 or other support structure into the channel 26, as will be described. Importantly, the base bracket 16 includes multiple inner surfaces o different contour to fit snugly and firmly against different types of support structures. The preferred base bracket configuration includes a central bracket leg 28 joined at one end to a primary support leg 30 which is set angularly, such as at an angle of about sixty degrees from the plane of the central leg 28. This primary support leg 30 has an inner surface defining an axially elongated recess 32 (FIG. 2) of generally semi-cylindrical cross section lined on both sides by generally flat platforms 34. A resilient liner 36 of plastic material or the like is conveniently provided as an overlay for the recess 32 and adjoining platforms 34 to prevent scratching of an engaged support structure.

The base bracket 16 also includes a secondary support leg 38 which is joined to an opposite end of the central bracket leg 28 by a short extension leg member 38'. This secondary support leg 38 is angularly set at a position generally in parallel with the primary support leg 30 and includes a threaded bore 40 (FIG. 3) through which a threaded clamp screw 42 extends. An adjustment knob 44 mounted on the leg 38 is manually rotatable to advance or retract the clamp screw 42 respectively toward and away from the primary support leg 30 for use in clamping the selected support structure against the primary support leg 30.

The adjustment knob 44 and its connection to the clamp screw 42 are shown in more detail in FIGS. 3 and 4. More particularly, with reference to FIG. 3, the clamp screw 42 extends through the threaded bore 40 to the outboard side of the secondary support leg 38 whereat the outboard end of the clamp screw 42 carries a radially enlarged drive key 46 secured thereto by a press-fit pin 47 or the like. This drive key projects radially beyond the outer diameter of the clamp screw 42 to extend into a diametrically opposed pair of longitudinally elongated slots 48 formed in the inner diameter surface of a drive sleeve 50. One axial end of the drive sleeve 50 is radially enlarged to provide a thrust component held axially against the outboard side of the secondary support leg 38 by an outer housing 52 of generally complementary shape. Screws 54 or the like are fastened through the leg 38 into the housing 52 to hold the housing in place. The drive sleeve 50 is keyed by a pin 56 or the like for rotation with a driven cap 58 mounted on the axially outboard end thereof. The adjustment knob 44 is supported in turn for rotation about the driven cap 58, with a thrust ring 60 on the knob 44 being captured between axially facing ends of the housing 52 and the driven cap 58 to prevent significant axial motion of the knob 44.

Rotational movement of the adjustment knob 44 is coupled via a clutch mechanism to the driven cap 58 for rotating the clamp screw 42. More specifically, an end plate 44' of the knob 44 and the driven cap 58 define axially facing pairs of recessed seats 61 and 62 for receiving a corresponding pair of drive balls 64. A spring plate 66 within the end plate 44' urges the drive balls 64 partially from the end plate seats 61 for reception into the seats 62 in the driven cap 58, as viewed in FIG. 3. In this position, the drive balls 64 are engaged between the side edges of the pairs of seats 61 and 62 to transmit rotary motion of the adjustment knob 44 to the driven cap 58 and further to the clamp screw 42. However, in the event of rotational forces exceeding the biasing effect of the spring plate 66, the drive balls 64 will ride axially into the end plate seats 61 in disengagement with the driven cap 58. Accordingly, excessive turning torques cannot be applied to the clamp screw 42. A set screw 68 is desirably provided on the end plate 44' to bear against the center of the spring plate 66 for adjusting the spring plate force applied to the drive balls 64.

The clamp screw 68 shown in FIG. 3 includes a recessed socket or head 69 of any suitable specialized nonstandard cross sectional shape, such as a triangular shape or the like, for receiving the end of a specialized adjustment tool 67 for adjustment purposes. This permits the set screw 68 to be advanced axially toward the spring plate 66 to increase the torque transmission between the knob 44 and the clamp screw 42, thereby achieving greater clamping force capability with an engaged support structure. Alternately, the set screw 68 can be retracted axially in a direction away from the spring plate 66 to reduce the spring force urging the drive balls 64 into the driven cap seats 62, and thereby decrease torque transmission with the clamp screw 42. In this regard, the specialized tool 67 can be used to adjust the set screw 68 for a high clamping force to permit secure clamping engagement with a support structure, followed by set screw readjustment for insufficient torque transmission to retract the clamp screw 42 from the support structure. This technique, using the specialized adjustment tool 67, prevents unauthorized removal of the clamp fixture 10 from the support structure, to correspondingly prevent loss or theft of the clamp fixture.

Accordingly, rotation of the adjustment knob 44 is thus effective to advance the inboard end of the clamp screw 42 into engagement with a support structure within the base bracket channel 26. Conveniently, for ease of operation, this inboard end of the clamp screw is fastened by staking or the like to a cylindrical base ring 70 which is rotatable relative to the clamp screw. A plastic shield 72 or the like is desirably mounted by press-fitting or the like onto the base ring 70 to prevent scratching of an engaged support surface. In the case of the upright pole 14 viewed in FIG. 1, advancement of the clamp screw 42 against the pole 14 functions to firmly seat the pole in a locked position within the semi-cylindrical recess 32 of the primary support leg 30. In this configuration, as previously described, the pole 14 extends axially through the channel 26. Alternately, the base bracket 16 can be locked onto other support structures such as the edge 74 of a tabletop 76 as viewed in FIG. 10, with the clamp screw 42 seating the tabletop securely against the flat platforms 34 of the primary support leg 30. Other support structures may be engaged by the base bracket 16 and appropriately clamped between the clamp screw 42 and the primary support leg 30.

The frame member 18 comprises a generally U-shaped component including a central frame bar 78 pivotally connected to the base bracket 16 and joined between the pair of parallel, outwardly projecting frame arms 22. As shown in FIGS. 1 and 6, this central frame bar 78 is fastened by rivets 80 or the like to a generally rectangular pivot plate 82. In turn, the pivot plate 82 is rotatably supported by a pivot pin 84 (FIG. 5) fastened into the central bracket leg 28 of the base bracket 16 to permit rotation of the entire frame member 18 about the rotational axis 20. While this pivot connection may take various forms, FIG. 5 shows a threaded pivot pin 84 fastened into the threaded bore of a bushing nut 86 supported by the base bracket, wherein the bushing nut has a radially enlarged inboard end which acts as a thrust member when the pivot pin 84 is fastened into the bushing nut. A wave spring washer 88 is conveniently provided to effectively lock the pin 84 and bushing nut 86 against relative rotation during rotation of the frame member 18. Moreover, if desired, a small wear ring 90 of a suitable low friction material can be interposed between the axially outboard end of the bushing nut 86 and the pivot plate 82, and a larger annular wear pad 92 of plastic material or the like can be received between the bracket leg 28 and the pivot plate 82.

A spring-loaded lock pin 94 (FIGS. 1 and 2) is carried by the base bracket 16 to provide releasable lock means for normally locking the pivot plate 82 and the frame member 18 against rotation relative to the base bracket 16. However, the spring-loaded lock pin 94 can be retracted quickly and easily by simple manual operation to permit rotation of the pivot plate 82 and the frame member 18 to a new rotational position relative to the base bracket. Accordingly, when the base bracket 16 is locked onto a selected available support structure, the frame member 18 can be reoriented as desired to a new adjustment position.

As shown best in FIG. 7, the spring-loaded lock pin 94 is mounted within a shallow bore 96 formed in the extension leg member 38' of the base bracket support leg 38. This bore 96 is interrupted generally at a mid-length position to define a laterally open window 98 within which a trigger lever 100 is connected to the lock pin 94. A biasing spring 101 within the base of the bore 96 normally urges the lock pin 94 and the trigger lever 100 thereon in a forward direction such that an end tip 94' of the lock pin 94 seats within an aligned shallow recess 102 formed in the inboard end of the pivot plate 82 on the frame member 18. Such reception of the lock pin into a pivot plate recess 102 effectively locks the entire frame member against rotation relative to the base bracket.

When adjustment of the frame member 18 to a new rotational position is desired, the trigger lever 100 can be retracted quickly and easily with fingertip pressure by drawing rearwardly thereon in the direction of arrow 104 in FIG. 7. Such retraction movement withdraws the end tip 94' of the lock pin 94 from the pivot plate recess 102 to permit free frame member rotation to a new position of rotational adjustment. When the selected new adjustment position is reached, the trigger lever 100 is permitted to return by action of the biasing spring 101 for seating the end tip 94' into a new pivot plate recess 102 aligned therewith. In this regard, in the preferred form of the invention as viewed in FIG. 8, four of the pivot plate recesses 102 are provided to permit frame member rotational locking at ninety degree intervals. Alternately, it will be understood that any number of such recesses can be provided for appropriately locking the frame member at other rotational positions, as desired.

The frame member 18 includes the pair of short frame arms 22 adapted for connection generally to the opposite sides of the supported medical instrument 12 or the like. More particularly, as shown in FIGS. 1 and 2, these frame arms 22 respectively include coaxially aligned ports for receiving mounting screws 105 extending in inboard directions along the rotational axis 24. In the preferred form, these mounting screws 105 are fastened into a corresponding pair of mounting shoes 106 which are connected in turn by screws 108 or the like to the selected instrument 12. As viewed in FIG. 2, these mounting shoes 106 are fastened to a rear face of the instrument 12 adjacent to the outside corners of an instrument housing, although it will be understood that the mounting shoes may be attached directly to the outboard sides of the instrument housing, or to other portions of the instrument housing, as desired.

The frame arms 22 further include a respective pair of index disks 110 which cooperate with the mounting shoes 106 to provide a detent lock mechanism for securely locking the instrument in a selected position of rotation relative to the axis 24. These index disks 110 are mounted onto the frame arms 22 in coaxial relation by small fasteners 112 or the like at the inboard sides of the frame arms. Each index disk 110 includes or defines a generally circular array of recessed detents 114 at close angular intervals, such as at about fifteen degree intervals, and oriented coaxially with respect to the axis 24. The recessed detents 114 on the index disks 110 are positioned for reception of an associated respective pair of detent balls 116 (FIGS. 2 and 9) on the associated mounting shoes 106 for releasably locking the mounting shoes 106 in a selected rotational position relative to the index disks 110 and also with respect to the frame arms 22. In the preferred form, these detent balls 116 are formed from a selected plastic material and biased by a small spring 118 to protrude outwardly from the mounting shoes with a selected spring biasing force. An adjustment screw 120 is provided for altering the spring force applied to the detent balls.

Accordingly, the clamp fixture of the present invention is advantageously adapted for secure mounting onto a variety of different support structures. The base bracket 16 is designed for quickly and easily locking firmly onto a selected support structure within a range of different sizes and shapes and physical orientations. Once the base bracket is locked into place, the frame member 18 is adjustable quickly and easily relative to the axis 20. Similarly, the instrument 12 is adjustable quickly and easily relative to the axis 24. This combination of adjustments with respect to the two perpendicular axes 20 and 24, both of which are oriented orthogonally to a primary axis of the support structure engaged by the base bracket, permit the instrument to be oriented in substantially any desired position for ease of operation, visibility and access. Alternately, if desired, the clamp fixture 10 can be used to stabilize an instrument placed without clamping onto a flat support surface, in which case the fixture provides an extended structure protruding rearwardly from the instrument. Moreover, in use, the clamp fixture may be used to support various other medical or nonmedical items in addition to the supported instrument.

A variety of modifications and improvements to the clamp fixture of the present invention will be apparent to those skilled in the art. Accordingly, no limitation is intended by way of the description herein and the accompanying drawings, except as set forth in the appended claims.

What is claimed is:

1. A clamp fixture for supporting a medical instrument or the like in a selected orientation relative to a selected support structure, said clamp fixture comprising:

a base bracket including means for locking said base bracket onto a selected support structure extending generally along a first axis;

means for preventing the unauthorized removal of said base bracket from a selected support structure;

a U-shaped frame member mounted at the base of the U to said base bracket for rotation with respect to said base bracket about a second axis oriented generally perpendicular to said first axis;

first releasable lock means for locking said U-frame member against rotation about said second axis relative to said base bracket;

means for connecting the arms of said U-shaped frame member to the instrument to permit rotation of the instrument with respect to the arms of said U-shaped frame member about a third axis; and second releasable lock means for locking the instrument supported by said frame arm against rotation about said third axis in a selected one of as plurality of preselected angular positions relative to the arms of said U-shaped frame member.

2. The clamp fixture of claim 1 wherein said base bracket has a generally U-shaped configuration defining an axial channel extending therethrough along said first axis, said base bracket comprising an inner bracket support surface and an adjustable clamp screw movable toward and away from said inner bracket support surface for respectively clamping and releasing the support structure relative to said inner bracket support surface.

3. The clamp fixture of claim 2 wherein said inner bracket support surface comprises at least first and second surfaces of different configuration for respectively engaging support structures of different geometry.

4. The clamp fixture of claim 3 wherein said first surface is defined by an elongated, generally semi-cylindrical recess extending generally in parallel with said first axis, and wherein said second surface is defined by a pair of relatively flat platforms lining the opposite sides of said first surface.

5. The clamp fixture of claim 3 further including a resilient linear overlaying said first and second surfaces.

6. The clamp fixture of claim 2 wherein said preventing means comprises an adjustment knob rotatably supported by said base bracket, and clutch means interconnecting said adjustment knob and said clamp screw whereby said clamp screw is manually moved toward and away from said inner bracket support surface by manual rotation of said adjustment knob.

7. The clamp fixture of claim 6 wherein said clutch means is adjustable to vary the maximum torque transfer between said adjustment knob and said clamp screw, said clutch means being adjustable to reduce the maximum torque transfer after said base bracket is locked onto a selected support structure to prevent unauthorized removal of said base bracket from a selected support structure.

8. The clamp fixture of claim 7 further comprising a nonstandard adjustment tool engageable with said clutch means to adjust the maximum torque transfer between said adjustment knob and said clamp screw.

9. The clamp fixture of claim 2 wherein said clamp screw includes an inboard end presented generally toward said inner bracket support surface, and further including a resilient shield covering said clamp screw inboard end.

10. The clamp fixture of claim 1 wherein said first releasable lock means comprises means for releasably locking said frame member at rotational intervals of approximately ninety degrees relative to said base bracket.

11. The clamp fixture of claim 1 wherein said first releasable lock means comprises a spring-loaded lock pin carried by said base bracket, a plurality of recesses formed in said frame member, each of said recesses being positioned for respectively receiving said lock pin when said frame member is rotated relative to said base bracket for alignment of said recess with said lock pin, and a trigger lever on said base bracket and connected to said lock pin for manually retracting said lock pin from the aligned recess in said frame member to permit rotation of said frame member relative to said base bracket.

12. The clamp fixture of claim 1 wherein said second releasable lock means comprises a detent mechanism for releasably supporting the instrument in said selected one of said plurality of preselected angular positions relative to the arms of said U-shaped frame member.

13. The clamp fixture of claim 12 wherein said detent mechanism comprises an index disk mounted on at least one of said arms of said U-shaped frame member and defining a generally circular array of recessed detents, and a mounting shoe connected to said at least one of said arms of said U-shaped frame member along said third axis and adapted for connection to the instrument, said mounting shoe supporting a detent ball for removable reception into a selected one of said recessed detents in said index disk.

14. The clamp fixture for claim 13 including means for biasing said detent ball outwardly from said mounting shoe.

15. The clamp fixture of claim 1 wherein said detent mechanism comprises a first index disk mounted on one of said arms of said U-shaped frame member and defining a generally circular array of recessed detents, a second indexed disk mounted on the other of said arms of said U-shaped frame member and defining a generally circular array of recessed detents, a first mounting shoe connected to said one arm of said U-shaped frame member along said third axis and adapted for connection to one side of the instrument, and a second mounting shoe connected to said other arm of said U-shaped frame member along said third axis and adapted for connection to the other side of the instrument, said first mounting shoes supporting a detent ball for removable reception into a selected one of said recessed detents in said first index disk, said second mounting shoes supporting a detent ball for removable reception into a selected one of said recessed detents in said first index disk.

16. A clamp fixture for supporting an instrument or the like in a selected orientation relative to a selected support structure, said clamp fixture comprising:

a base bracket for receiving a portion of a selected support structure therein;

means for clamping said base bracket onto a selected support structure extending generally along a first axis, said clamping means exerting an axial force causing a selected support structure to be gripped between said clamping means and a portion of said base bracket;

means for actuating said clamping means, said actuating means being adjustable to modulate the amount of torque transmitted from said actuating means to said clamping means;

a U-shaped frame member mounted at the base of the U to said base bracket for rotation with respect to said base bracket about a second axis oriented angularly to said first axis;

first releasable lock means for locking said U-shaped frame member against rotation about said second axis relative to said base bracket;

means for connecting the arms of said U-shaped frame member to the instrument to permit rotation of the instrument with respect to the arms of said U-shaped frame member about a third axis; and second releasable lock means for locking the instrument supported by said frame arm against rotation about said third axis in a selected one of a plurality of angular positions relative to the arms of said U-shaped frame member.

17. The clamp fixture of claim 16 wherein said clamping means includes a clutch mechanism for preventing application of clamping forces to the support structure beyond a predetermined limit.

18. The clamp fixture of claim 16 wherein said base bracket includes surface means for securely engaging and supporting different support structures of different geometry.

19. The clamp fixture of claim 16 wherein said first releasable lock means comprises a spring-loaded lock pin on said base bracket for reception into a selected one of a plurality of recesses formed in said frame member, and a manually retractable trigger lever for manually retracting said lock pin from said frame member.

20. The clamp fixture of claim 16 wherein said second releasable lock means comprises a detent mechanism cooperating between at least one of the arms of said U-shaped frame member and the instrument.

21. The clamp fixture of claim 20 further including a mounting shoe adapted for connection to the instrument, said detent mechanism cooperating between said at least one of the arms of said U-shaped frame member and said mounting shoe.

22. A clamp fixture for supporting an instrument or the like in a selected orientation relative to a selected support structure; said clamp fixture comprising:
- a generally U-shaped base bracket of open-sided construction and defining an axially open channel extending generally along a first axis, said base bracket including a primary support leg having a first inner support surface defined by an elongated and generally semi-cylindrical recess oriented generally in parallel with said first axis, and a second surface defined by a pair of relatively flat platforms lining the opposite sides of said recesses;
- a clamp screw carried by said base bracket for movement toward and away from said primary support leg for respectively locking onto and releasing the selected support structure;
- an adjustment knob carried by said base bracket;
- a clutch mechanism connected between said adjustment knob and said clamp screw;
- a generally U-shaped frame member having a central frame bar and a pair of generally parallel frame arms;
- pivot means for rotatably connecting said central frame bar of said frame member to said base bracket for rotation of said frame member about a second axis oriented generally perpendicular to said first axis;
- first releasable lock means for releasably locking said frame member against rotation about said second axis in a selected position of rotational adjustment; and
- detent means carried by said pair of frame arms adapted for connection coaxially to the instrument to permit rotation of the instrument relative to said frame arms about a third axis which may be oriented generally perpendicularly to said first and second axes, said detent means including second releasable lock means for releasably locking the instrument against rotation about said third axis in a selected position of rotational adjustment.

23. The clamp fixture of claim 22 wherein said first and second surfaces of said primary support leg and an inboard end of said clamp screw presented toward said first and second surfaces are coated with a resilient shielding material.

24. The clamp fixture of claim 22 wherein said base bracket includes a central support leg, said frame member being rotatably supported from said central support leg, and said primary support leg of said base bracket being oriented a tan angle of about sixty degrees relative to said central support leg, said clamp screw being supported by said base bracket for movement toward and away form said primary support leg at an angle of about ninety degrees to said primary support leg.

25. The clamp fixture of claim 22 wherein said detent means comprises a pair of index disks carried by said frame arms and each including a generally circular array of recessed detents disposed generally coaxially with said third axis, and wherein said second releasable lock means comprises a pair of mounting shoes adapted for connection to the instrument and each including a detent ball for releasable reception into an aligned one of said detents in a respective one of said index disks.

26. The clamp fixture of claim 22 further including a nonstandard adjustment tool engageable with said clutch mechanism for adjusting the torque transfer between said adjustment and said clamp screw said clutch mechanism being adjustable to reduce the torque transfer after said base bracket is locked onto a selected support structure to prevent unauthorized removal of said base bracket from a selected support structure.

27. The clamp fixture of claim 26 wherein said clutch mechanism comprises a spring plate carried by said adjustment knob, a cap member carried by said clamp screw and having at least one recessed seat formed therein, a drive ball urged by said spring plate into said recessed seat in said cap member, and an adjustment screw carried by said adjustment knob in bearing engagement with said spring member, said specialized adjustment tool being engageable with said adjustment screw to vary the spring force applied to said drive ball by said spring plate.

* * * * *

UNITED STATES PATENT AND TRADEMARK OFFICE
CERTIFICATE OF CORRECTION

PATENT NO. : 4,832,299
DATED : May 23, 1989
INVENTOR(S) : Lanny A. Gorton and Gerald W. Schmidt It is certified that error appears in the above-indentified patent and that said Letters Patent is hereby corrected as shown below:

Column 4, line 53, change "best in FIGS. and 2," to --best in FIGS. 1 and 2,--

Column 12, line 21 (Claim 24), change "a tan angle" to --at an angle--

Signed and Sealed this

Twenty-second Day of July, 1997

Attest:

BRUCE LEHMAN

Attesting Officer

Commissioner of Patents and Trademarks